INVENTOR
GORDON H. JONES

July 26, 1960  G. H. JONES  2,946,232
GEAR DRIVE
Filed Aug. 1, 1957  4 Sheets-Sheet 3
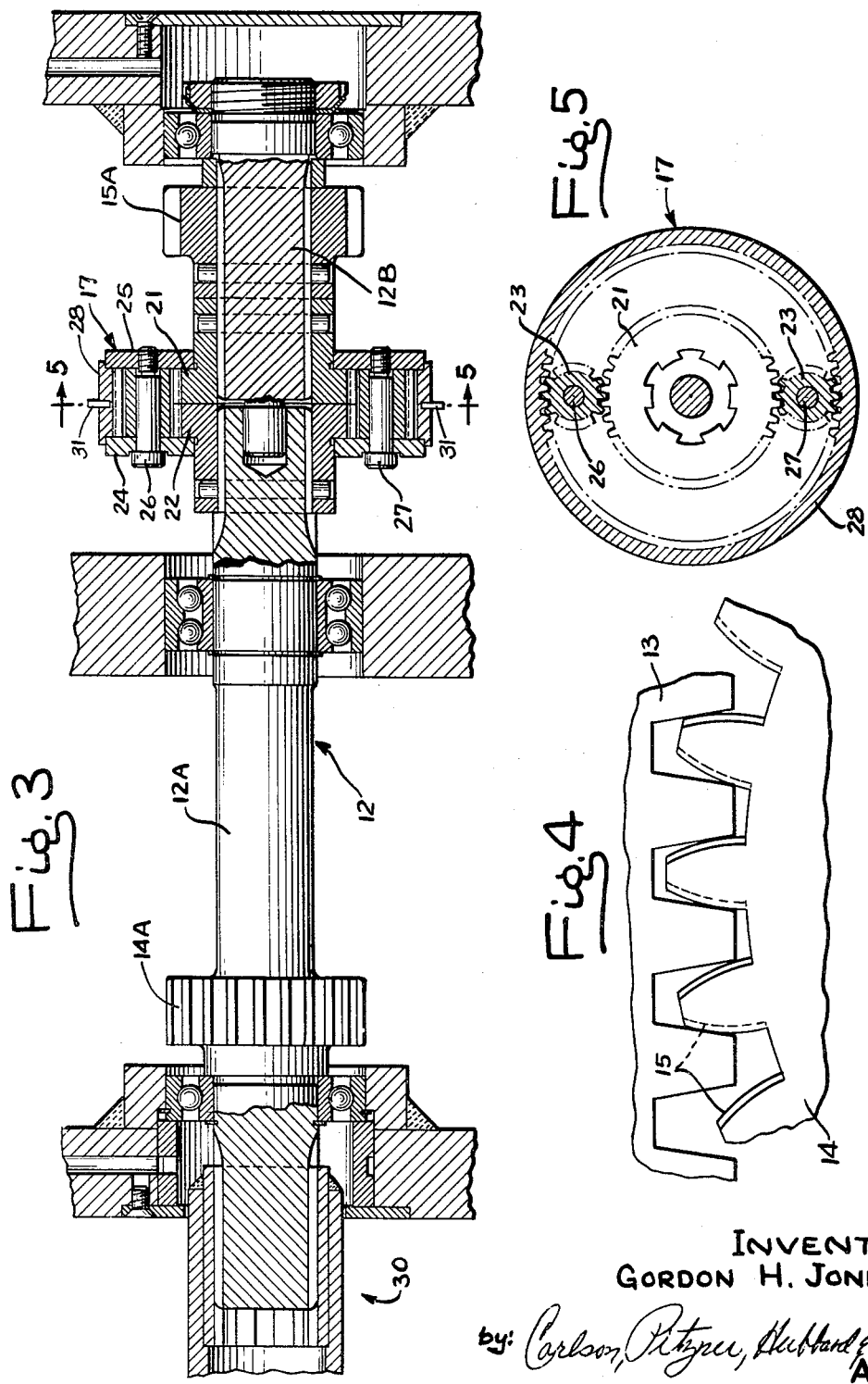
INVENTOR
GORDON H. JONES
by: Carlson, Pitzner, Hubbard & Wolfe
ATTYS July 26, 1960 G. H. JONES 2,946,232
GEAR DRIVE
Filed Aug. 1, 1957 4 Sheets-Sheet 4

INVENTOR
GORDON H. JONES

United States Patent Office 2,946,232
Patented July 26, 1960

2,946,232
GEAR DRIVE

Gordon H. Jones, Fond du Lac, Wis., assignor to Giddings & Lewis Machine Tool Company, Fond du Lac, Wis., a corporation of Wisconsin Filed Aug. 1, 1957, Ser. No. 675,731

18 Claims. (Cl. 74—409)

This invention relates to a method and means for reducing the effect of backlash and deflection in gear drives.

It is the principal object hereof to apply the method and means of this invention to a gear drive for a machine, and more specifically a gear drive for traversing the table of a machine tool whereby accurate, positive, positioning of the table in both forward and reverse directions of table movement is desired.

Heretofore different methods have been employed for reducing backlash in gear drives. One such method utilizes a resilient element for angularly advancing the gears in the drive to take up physical backlash due to play between the elements of the drive. With drives so constructed, the drive is substantially free from lost motion due to such physical backlash in one direction of rotation, however in the reverse direction torque is transmitted through the resilient element which deforms resulting in reduced drive rigidity and lost motion. Thus the capacity of this type of drive for an allowable lost motion in the reverse direction of rotation is limited by the resilient element.

Moreover, while in one direction of rotation such drives may be substantially free from backlash attributable to relative movement between the drive elements, no provision is made to reduce lost motion due to actual diflections of the drive elements which occur when torque is transmitted by means of the drive.

It is now proposed to obtain equal drive rigidity in both directions of rotation by utilizing paralleled trains or sets of gears, applying a torque oppositely to the sets of gears to preload the drive, and locking the sets of gears to each other with the drive in the preloaded condition, utilizing the deflections of the elements of the sets of gears to maintain the preloaded condition.

Another object of the invention is to apply a predetermined preload on the drive for the purpose of reducing lost motion in the drive due to actual deflections of the drive elements.

A more specific object of the invention is to provide a gear drive for the table of a machine tool, employing paralleled sets of spur gears terminating in bull gears enmeshed with a rack on the underside of the table, and wherein means are provided for reducing lost motion due both to physical backlash and deflections of the drive elements.

Another object is to provide a differential gear mechanism for applying load oppositely to the sets of spur gears.

Further objects will appear from the following description taken in connection with the accompanying drawings, wherein:

Fig. 3 is a section illustrating the driveshaft and differential gear mechanism used to preload the drive, and is taken substantially in the plane of lines 3—3 of Figure 1;

Fig. 4 is an enlarged fragmentary view in elevation of the teeth of the enmeshed rack and bull gears and illustrates the angular offset of these gears;

Fig. 5 is a vertical section showing details of the differential gear mechanism, and is taken substantially in the plane of lines 5—5 of Fig. 3;

Figure 1:
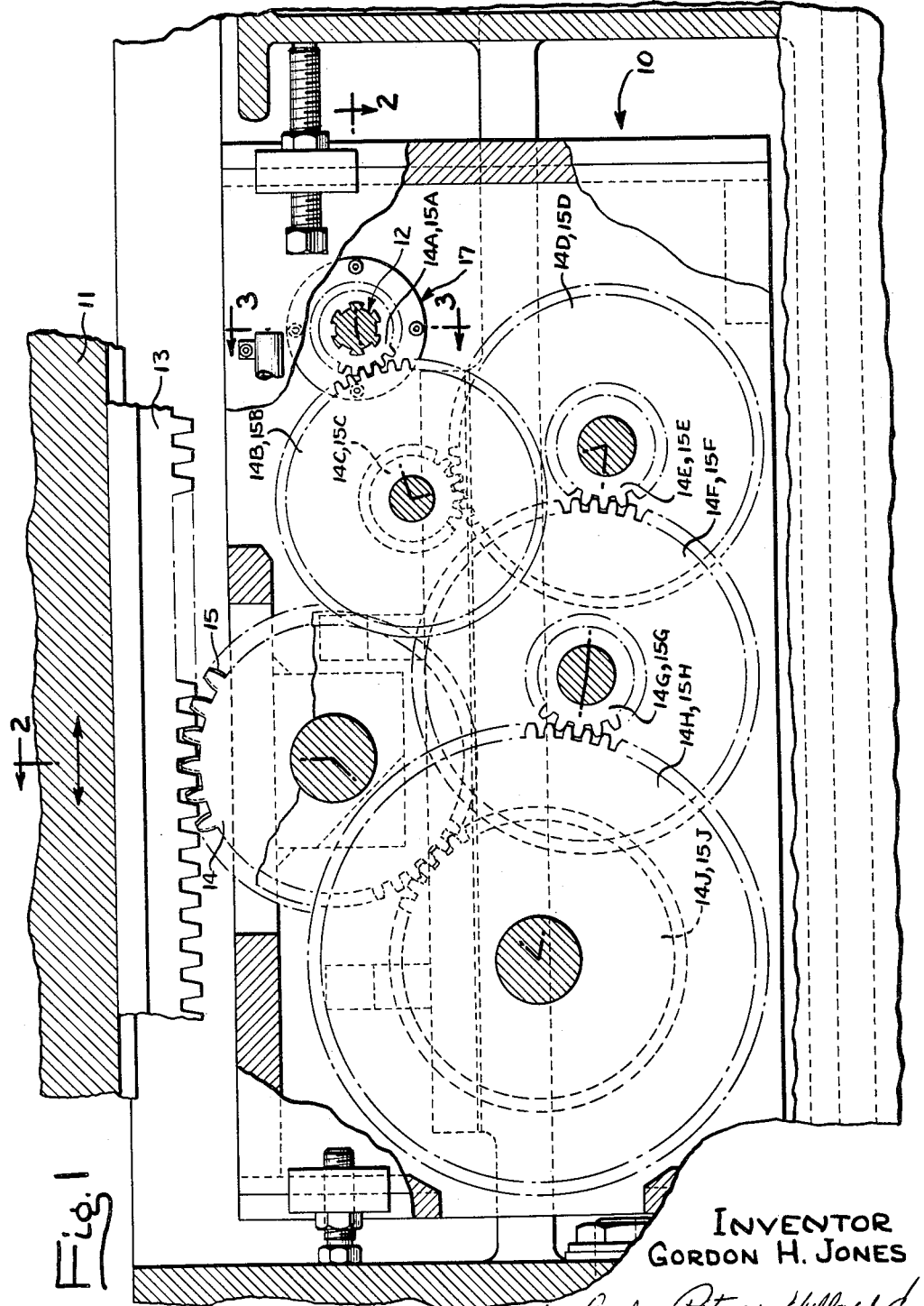
Figure 1 is a section showing a gear drive for a machine, such as a gear drive for the table of a machine tool.
Figure 2:
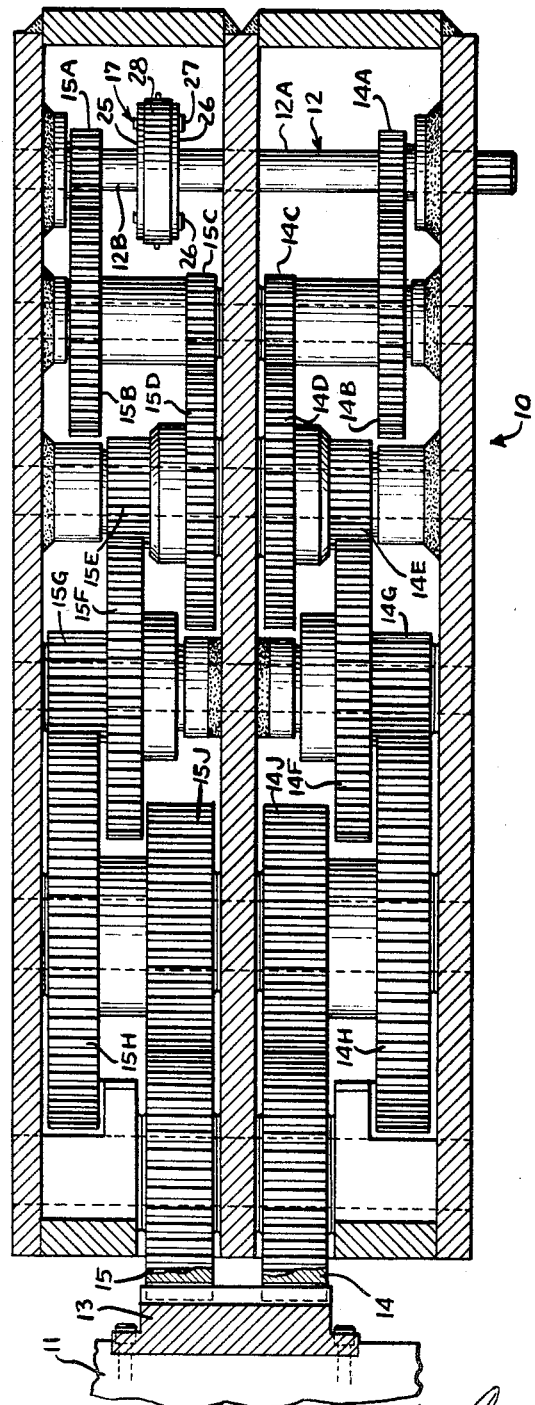
Fig. 2 is a developed section taken in the offset planes of lines 2—2 of Figure 1.

While the present invention is susceptible of various modifications and alternative constructions, there is shown in the drawings and will be described herein in detail one illustrative form of the invention. However it is to be understood that it is not thereby intended to limit the invention to the specific form disclosed, and it is intended to embrace all modifications, alternative constructions and equivalents falling within the spirit and scope of the invention as expressed in the claims.

Referring to Figure 1, the present invention is shown embodied for illustrative purposes in a speed reduction drive 10, which is mounted below the table 11 of a machine tool such as a planer miller. The drive 10 is arranged for transmitting power from a driving member such as a driveshaft 12 to a driven member such as a rack 13 on the underside of the table for traversing the table horizontally in both forward and reverse directions. The term "reversible" as used herein and in the claims with respect to the drive 10, means that the drive is effective to operate the driven member in either the forward or reverse directions. Normally, lost motion is present in gear drives of this type attributable (1) to physical backlash or play between meshing gears, and (2) to deflections such as shaft windup, deflection of gear teeth, and deflections in bearings and bearing mountings. In order to enable accurate machining of a workpiece supported on a table of a machine tool such lost motion is required to be kept at a minimum.

Enmeshed with the rack 13 is a pair of bull gears 14, 15 which are driven by sets of speed reduction spur gears 14A—J, 15A—J respectively. The sets of spur gears 14A—J, 15A—J in the present instance, are substantially identical and afford a speed reduction of 117 to 1, being arranged to be driven in from the driveshaft 12 through the drive gears 14A, 15A. Thus the drive includes a pair of sets or trains of gears between the driving and driven members, having substantially equal torque transmitting capacities.

In carrying out the present invention, torque is applied oppositely to the sets or trains of spur gears so as to preload the drive, and means are provided for rigidly locking one train or set of gears to the other with the drive in the preloaded condition, wherein all elements in each gear set have an initial deflection, so as to obtain equal drive rigidity in both directions of rotation. Different methods may be employed for applying torque oppositely to the sets of gears so that the trains of gears have mutually opposed internal loading. As illustrative of the preferred method, means are provided between the sets of gears effective for applying torque and also useful for locking the drive in the preloaded conditoin. In keeping with the foregoing, so that the gears of one set, upon the application of such torque may be angularly adjusted relative to the gears of the other set, the driveshaft 12 is made in separate sections 12A, 12B connected by a releasable differential gear mechanism 17.

In the present instance, referring to Figs. 3 and 5, the differential gear mechanism 17 includes sun gears 21, 22 fixed to the shaft sections 12A, 12B, planet gears 23 (two are shown) supported on a carrier comprised of spaced rings 24, 25, and a ring gear 28 meshing with the planet gears. Bolts 26, 27 are employed for connecting the spaced rings 24, 25 of the carrier, which may be loosened to release the mechanism or may be tightened to lock the mechanism for holding the planet gears against rotation and effectively rigidly connect the sun gears 21, 22 so that the shaft sections 12A, 12B, turn in unison. When the bolts 26, 27 are loosened they serve for rotatably mounting the planet gears 23. With the differential gear mechanism 17 locked, rotation of the driveshaft 12 from a power source 30 is effective for driving the table 11 through the paralleled sets of spur gears 14A—J, 15A—J terminating in the bull gears 14, 15 respectively.

The differential gear mechanism 17 used for releasably coupling the driveshaft sections 12A, 12B together, when released provides means for applying torque in opposite directions to the alined driveshaft sections 12A, B. In the present instance this is accomplished by rotating the ring gear 28 relative to the driveshaft 12. Such rotation, due to the differential in the number of teeth on the sun gears 21, 22 (herein these sun gears have 46 and 48 teeth, respectively) causes the sun gears and the shaft sections 12A, 12B to rotate relative to each other. This has the effect of progressively angularly offsetting the drive gears 14A, 15A and each successive gear in the trains 14A—J, 15A—J until all physical play is taken up, the relative angular positions of the bull gears 14, 15 when such has been accomplished being shown in Fig. 4.

As mentioned above, deflections of the elements of the drive as well as physical backlash produces lost motion in gear drives. Accordingly, further in carrying out the invention, it is contemplated that a predetermined torque is to be oppositely applied to the paralleled sets of gears for the purpose of reducing lost motion in the drive due, not only to physical backlash, but also that due to such deflections. Under actual practice, it has been found satisfactory to preload the drive to approximately 50% capacity. Thus when the output torque equals the drive capacity, since the preload torques are opposed, one set of gears is fully loaded and the load on the other set of gears approaches zero. It is noted that the total capacity of the drive is substantially unaffected by the amount of preload. The amount of preload, however, does affect the extent to which lost motion is reduced. This example of the amount of preload to be applied is given as illustrative only, for, as will be evident, the specific values of preload which are selected for a drive constructed in accordance with the teachings of this invention would be dependent upon the structural characteristics and rating of the drive.

Figure 7:
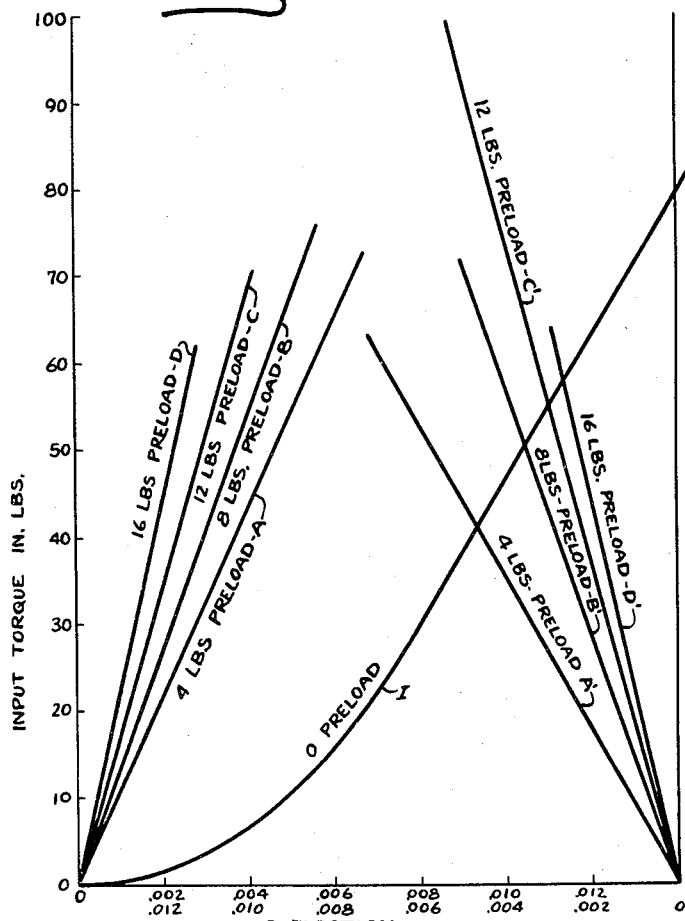
Fig. 7 is a reproduction of a series of curves depicting the lost motion in the drive for different preload values.
Figure 6:
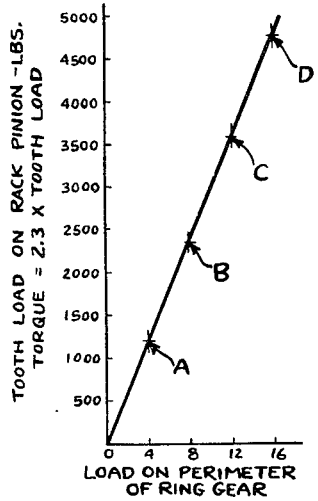
Fig. 6 is a reproduction of a curve depicting output torque corresponding to different forces applied tangentially to the perimeter of the ring gear of the differential gear mechanism.

For facilitating applying force for rotating the ring gear 28, pins 31 are mounted on its periphery. A tangential force may then be applied to the ring gear to rotate the same in the desired manner. It will be evident that preloading the drive to 50% capacity affords certain advantages, however, it may be desired to apply other values of preload to the drive. The differential gear mechanism 17 may be used for applying different amounts of preload to the drive. For explaining the effect of applying different amounts of preload to a drive constructed in accordance with the invention as regards reduction in lost motion, reference is made to Figs. 6 and 7 which reproduce curves made from results of tests conducted on the drive. Figure 6 shows a curve illustrating output torque corresponding to different forces (pounds preload) applied tangent to the perimeter of the ring gear 28. Wind-up values for various amounts of preload (pounds preload) are shown in Fig. 7, "wind-up" being defined for present purposes as the rack motion (13) corresponding to the rotation of the driveshaft 12 as the system deflects in being loaded to a particular output torque. Thus, applying a predetermined torque after all physical play is taken up deflects each of the elements of the drive, the cumulative deflections of all the elements comprising the total deflection of the system.

With "0" preload, the wind-up for the forward direction of drive movement is shown in Fig. 7 on curve I and is substantial even at low values of input torque. The curve showing wind-up in the reverse direction is not shown but is about the same as curve I.

Applying as low a value as 4 pounds of preload to the drive, as shown in Fig. 7 on curves A, A', produces a startling reduction in lost motion and, in fact, the lost motion in the drive is reduced to a comparatively insignificant amount. Curves B, B', C, C', and D, D' for different amounts of preload, for 8, 12 and 16 pounds respectively, all pass through the origin of Fig. 7, indicating that backlash has been completely eliminated in the drive and show that further reductions in lost motion are obtained by increasing the preload. In Fig. 7 the family of curves at the left-hand side of the figure indicate forward direction of rotation of the drive, while the family of curves on the right-hand side are for reverse direction of the drive. From a comparison of these families of curves it also will be evident that the characteristics of wind-up for the drive in both directions of rotation are very similar. Thus, whatever inherent degree of resilience is encountered in the drive remains constant and substantially the same in both directions of drive rotation or of table movement and a rigid, relatively non-resilient drive is obtained through either gear train in both forward and reverse directions of the drive.

Another important characteristic of the drive will be evident from the drawings. It is a feature of this invention that the high speed end of the drive is less highly stressed than the low speed (high torque) end. The more highly stressed end of the drive, at the rack, has been made as heavy as possible as will be clear from an examination of Figure 1, and the remaining gears designed so that they are reasonably loaded and thus, readily producible or obtainable.

A further important feature of the illustrative drive embodying the present invention is the relatively high efficiency thereof. The achievement with the present invention is the provision of a reversible gear drive using spur gears, thus enabling operation at the high efficiency for which this type of gearing is noted, with means for reducing the excessive lost motion for which spur gearing is also noted. The efficiency of the drive shown in the drawings has been measured as approximately 80%.

While preloading of the drive may be accomplished as described herein, through the use of a differential gear mechanism, the elements of which may be keyed or locked together after having been set in a given relationship, other non-resilient devices equivalent to the arrangement herein disclosed may be used for this purpose. Whatever the form of the preloading mechanism, it should provide for the application of torque to the respective gear trains in opposite directions so as to offset one against the other, along with means to rigidly lock or key the gear trains in the angular relationship thus established. When locked in the preloaded condition, the deflection of the elements of the gear trains, including the shafts supporting the gears and the gears themselves, is utilized to maintain the drive in the preloaded condition.

While a gear drive as disclosed herein may find different applications, it is particularly useful where the component to be driven has great inertia and high torques are involved in the drive of the component. For example, a drive embodying the present invention has been built for moving the table of a planer miller as illustrated in the copending application of Daugherty and Sorenson, Serial No. 576,473, filed April 5, 1956, now Patent No. 2,849,927 wherein the table weighs over 11 tons. In such a unit, with a drive constructed as disclosed herein, wherein one revolution of the driveshaft equals approximately 100 inches rack motion, up to 300 inches per minute rapid traverse rate of the rack and table has been obtained with the addition of a gear box housing and up-drive unit coupled to the motor and driveshaft.

I claim as my invention:

1. In a reversible gear drive, the combination comprising a rack, parallel gear trains for driving the rack including a pair of drive gears adjustable angularly with relation to each other, sets of spur gears terminating in respective bull gears enmeshed with said rack, said sets of spur gears being arranged to be driven by said drive gears respectively, means for applying torque oppositely to said drive gears for adjusting the same angularly with relation to each other for preloading the sets of gears, by causing deflection of each of the gears in the gear trains and means for locking the pair of drive gears in fixed relation in a given adjusted relation so that the resilience due to the deflection of the gears is utilized to maintain the preloading.

2. In a reversible gear drive, drive elements including a toothed driven member, paralleled trains of gears for driving said driven member including a pair of drive gears adjustable angularly with relation to each other, sets of gears terminating in respective gears enmeshed with said driven member, said sets of gears being arranged to be driven by said drive gears respectively, and means for reducing lost motion due to backlash and deflection of the drive elements, said means comprising, in combination, means for applying a predetermined torque oppositely to said sets of gears thereby to adjust the gears of one set angularly with relation to the gears of the other for preloading the drive, by causing deflection of each of the gears in the gear trains and means for locking the sets of gears in the adjusted relation so that the resilience due to the deflection of the gears is utilized to maintain the preloading.

3. In a reversible gear drive for a machine, drive elements including a first gear train comprising a drive gear and a series of spur gears, a second gear train substantially identical to the first and in parallel therewith, a toothed member arranged to be driven by said gear trains, means for oppositely preloading said gear trains by angularly adjusting the gears of one train relative to the gears of the other, and causing deflection of each of the gears in the gear trains so that the resilience due to the deflection of the gears is utilized to maintain the preloading and means for locking the trains of gears in the adjusted relation to reduce lost motion due to backlash and deflection of the elements of the drive.

4. In a reversible gear drive having a first gear train comprising a drive gear and a series of spur gears, a second gear train substantially identical to the first and arranged in parallel therewith, and means arranged to be driven by the gear trains, the combination comprising, means for preloading said drive by applying torque to one of said drive gears and adjusting it angularly relative to the other drive gear, causing deflection of each of the gears in the gear trains and means for locking one train of gears to the other so that the resilience due to the deflection of the gears is utilized to maintain the drive in the preloaded condition.

5. In a reversible gear drive for a machine, a toothed rack, a pair of driving gears, a pair of bull gears enmeshed with said toothed rack and coupled to said driving gears respectively by gear means comprising sets of spur gears, means for angularly offsetting the gears of one of said sets relative to the gears of the other set respectively causing deflection of each of the gears so as to load one set of gears against the other, and means for locking the sets of gears in the loaded condition so that the deflection of the gears is utilized to maintain the loaded condition.

6. In a reversible gear drive for a machine, a driveshaft having separate sections, a pair of driving gears fixed on said sections respectively, a rack to be driven, a pair of bull gears enmeshed with said rack and coupled to said driving gears respectively by gear means comprising sets of spur gears, means for angularly offsetting the sections of said driveshaft causing deflection of each of the gears so as to load one set of gears against the other, and means for locking the shaft sections in a given offset relation so that the deflection of the gears is utilized to maintain the loaded condition.

7. In a gear drive, gear means comprising paralleled sets of gears connecting driving and driven members, means for adjusting one set of gears angularly relative to the other causing each gear to deflect and preloading the drive, and means for locking one set of gears to the other in the adjusted relation so that the deflection of the gears is utilized to maintain the drive in the preloaded condition.

8. In a reversible gear drive, gear means comprising paralleled sets of gears connecting driving and driven members, means for adjusting one set of gears angularly relative to the other causing each gear to deflect such as to preload the drive to substantially 50% of the capacity of the drive, and means for locking one set of gears to the other in the adjusted relation such that the deflection of the gears is utilized to maintain the drive in the preloaded condition.

9. In a gear drive, gear means comprising paralleled sets of gears connecting driving and driven members, means for applying torque in one direction to one set of gears and in the opposite direction to the other set of gears so as to cause each gear to deflect an amount greater than that required to take up lost motion between the gears thus preloading the drive, and means for locking one set of gears to the other in the adjusted relation such that the deflection of the gears is utilized to maintain the drive in the preloaded condition.

10. In a gear drive, gear means comprising paralleled sets of spur gears connecting driving and driven members, means for applying a torque in one direction to one and in the opposite direction to the other set of spur gears of such magnitude that causes each gear to deflect thereby preloading the drive a predetermined amount, and means for locking one of the sets of gears to the other with the drive in the preloaded condition.

11. In a gear drive for a machine, a rack, a pair of driving gears, gear means comprising paralleled sets of spur gears connecting said driving gears respectively and said rack, means for applying a torque in one direction to one set of spur gears and in the opposite direction to the other set of spur gears causing each gear to deflect, said torque being of such magnitude as to preload the drive to substantially 50% of the capacity of the drive, and means for locking one set of gears to the other with the drive in the preloaded condition such that the deflection of the gears is utilized to maintain the preload.

12. In a reversible gear drive for a machine, a driveshaft having a pair of separate sections, a pair of drive gears fixed on said sections respectively, a rack to be driven, substantially alike sets of speed reduction spur gears coupled to said drive gears respectively and terminating in bull gears enmeshed with said rack, means for angularly offsetting said drive gears relative to each other for loading one set of gears against the other, releasable means connecting said shaft sections allowing said shaft sections to be relatively angularly adjusted and including means for locking the shaft sections in a given adjusted relation.

13. In a reversible gear drive for a machine, a driveshaft having a pair of separate sections, a pair of drive gears fixed on said sections respectively, a rack to be driven, substantially alike sets of speed reduction spur gears coupled to said drive gears respectively and terminating in bull gears enmeshed with said rack, means for angularly offsetting said drive gears relative to each other for loading one set of gears against the other, means connecting said shaft sections including means for applying torque in opposite directions to said shaft sections, and means for locking the shaft sections in fixed relation with the drive gears in a given angularly offset relation.

14. In a reversible gear drive for a machine, a driveshaft having a pair of sections, a pair of drive gears fixed on said sections respectively, a rack to be driven, sets of speed reduction spur gears coupled to said drive gears respectively and terminating in bull gears enmeshed with said rack, means for oppositely preloading said sets of gears comprising a pair of sun gears mounted on said drive shaft sections respectively and having a relatively small differential in the number of gear teeth, planet gears meshing with said sun gears, a ring gear meshing with said planet gears, said ring gear being effective upon movement relative to said sun gears to angular rotate said shaft sections with relation to each other, and releasable means for selectively allowing such movement of the ring gear or locking said shaft sections against relative rotation.

15. In a reversible gear drive, gear means comprising paralleled sets of gears connecting driving and driven members, means for loading one set of gears against the other comprising a pair of sun gears mounted in drive relation with said sets of gears respectively and having a relatively small differential in the number of gear teeth, a ring gear, planet gears connecting said ring and sun gears so that said ring gear is effective upon movement relative to the sun gears to angularly rotate the same relative to each other, and releasable means selectively operable to allow such movement of the ring gear or to lock said sun gears against relative rotation.

16. In a reversible gear drive for a machine, a pair of drive gears, a pair of gears enmeshed with a toothed driven member and coupled to said drive gears respectively by gear means comprising means for angularly offsetting said drive gears relative to each other, comprising a pair of sun gears mounted in fixed relation with said drive gears respectively and having a relatively small differential in the number of gear teeth, a ring gear, means for connecting said ring and sun gears so that said ring gear is effective upon movement relative thereto to angularly rotate the sun gears relative to each other, and releasable means selectively operable to allow such movement of the ring gear or to lock said sun gears against relative rotation.

17. In a gear drive for a machine, the combination comprising, a driving member, a driven member, means including a pair of trains of gears connected in parallel between said members, said trains of gears having substantially equal torque transmitting capacities, and means for rigidly locking one of said gear trains to the other with said trains of gears in a preloaded condition wherein all elements in each of said gear trains have an initial deflection applying mutually opposed internal loading between said trains of gears, said deflection being effective to maintain said trains of gears in a preloaded condition under an externally applied load.

18. In a gear drive for a machine, the combination comprising, a driving member, a driven member, means including a pair of trains of gears connected in parallel between said members, said trains of gears having substantially equal torque transmitting capacities, means for preloading the drive by deflecting all elements in each of said gear trains so as to apply mutually opposed internal loading between said trains of gears, and means for rigidly locking one of said gear trains to the other with said trains of gears in the preloaded condition, said deflection being effective to maintain said trains of gears in said preloaded condition under an externally applied load.

References Cited in the file of this patent

UNITED STATES PATENTS

| 410,425 | Matthews | Sept. 3, 1889 |
| 748,412 | Norris | Dec. 29, 1903 |
| 1,578,983 | Gassett | Mar. 30, 1926 |
| 2,283,746 | Lohs | May 19, 1942 |
| 2,424,864 | Halbrook | July 29, 1947 |
| 2,717,522 | Mottu | Sept. 13, 1955 |
| 2,737,056 | Baumgartner | Mar. 6, 1956 |